United States Patent
Chen

(10) Patent No.: US 8,346,422 B2
(45) Date of Patent: Jan. 1, 2013

(54) HYBRID ELECTRIC VEHICLE THERMAL MANAGEMENT SYSTEM

(75) Inventor: Elaine Chen, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 348 days.

(21) Appl. No.: 12/786,415

(22) Filed: May 24, 2010

(65) Prior Publication Data

US 2011/0288701 A1  Nov. 24, 2011

(51) Int. Cl.
*B60L 11/00* (2006.01)
*B60K 1/00* (2006.01)
*B60H 1/00* (2006.01)

(52) U.S. Cl. ............................ 701/22; 180/65.1; 62/133

(58) Field of Classification Search ...................... 701/22
See application file for complete search history.

(56) References Cited

U.S. PATENT DOCUMENTS

| | | |
|---|---|---|
| 5,755,378 A | 5/1998 | Dage et al. |
| 5,988,517 A | 11/1999 | Bauer et al. |
| 6,073,456 A * | 6/2000 | Kawai et al. ..................... 62/133 |
| 6,347,746 B1 | 2/2002 | Dage et al. |
| 6,450,275 B1 | 9/2002 | Gabriel et al. |
| 6,868,900 B2 | 3/2005 | Dage et al. |

* cited by examiner

*Primary Examiner* — Thomas Tarcza
*Assistant Examiner* — Tyler J Lee
(74) *Attorney, Agent, or Firm* — David B. Kelley; Just Intellectuals, PLLC

(57) ABSTRACT

The present disclosure relates to thermal management systems and methods for operating a vehicle, such as a hybrid electric vehicle. The systems determine a sunload and set calibrated thresholds and modified temperatures for deriving conditions for sending engine climate commands according to the sunload readings. The calibrations and modifications are designed to yield better vehicle fuel economy.

17 Claims, 8 Drawing Sheets

HYBRID ELECTRIC VEHICLE THERMAL MANAGEMENT SYSTEM

TECHNICAL FIELD

The present disclosure relates generally to the operation of hybrid electric and electric vehicles. Specifically, methods and systems for operating a vehicle powertrain according to environmental conditions, such as sunload readings, are discussed herein.

BACKGROUND

Conventional hybrid electric vehicles (or "HEVs") include thermal devices to control the vehicle cabin temperature for passenger comfort. When the engine is warmed the engine coolant can add thermal energy to the vehicle's heating, ventilation and air conditioning system (or "HVAC"). Existing HEV controls are configured to enable the coolant temperature to quickly reach and maintain a desired range. Sunload is typically not accounted for in these strategies. When there is full sunload, the electronic automatic temperature control system (or "EATC") does not need the discharge air to be as warm as it would be without any sunload. For example, in some vehicles the necessary target discharge air temperature can be around 15° F. to 20° F. lower than it would be in a no sun condition. Consequently, engine coolant temperature targets are calibrated to be higher than they need to be in sunnier conditions. Current EATC systems control the discharge air temperature by moving a blend door to blend in cooler air. Since the engine coolant is warmer than needed for heating purposes, the discharge air is remedially cooled down through blending in cool air. Therefore, energy is being wasted by heating the engine coolant more than what is necessary.

One existing cooling system for a hybrid electric vehicle is taught in U.S. Pat. No. 6,450,275 titled "Power Electronics Cooling for a Hybrid Electric Vehicle." The '275 patent teachings determining speed for a cooling fan based upon the electronic components of the vehicle and the internal combustion engine. It is desirable to have a vehicle thermal management system that accounts for sunload.

Another existing HVAC takes a number of variables, including sunload, into consideration in controlling the vehicle interior temperature. See U.S. Pat. No. 5,988,517 titled "Method and System for Controlling an Automotive HVAC System Based on the Principle of HVAC Work." Still this system does not consider control of the vehicle's powertrain to accommodate the vehicle's climate needs.

Therefore, there is a need for a method of controlling an HEV's thermal management system in consideration of solar energy. Unnecessary powering on and off of the engine or vehicle powertrain can be avoided.

SUMMARY

The present invention(s) may address one or more of the above-mentioned issues. Other features and/or advantages may become apparent from the description which follows.

One exemplary embodiment of the present invention relates to a method of controlling a hybrid electric vehicle, the method includes: determining an engine coolant temperature; determining an ambient temperature; determining a sunload; and deriving a condition for sending a climate engine request according to the sunload. The climate engine request includes an engine-on or an engine speed instruction. Deriving a condition includes setting a calibrated threshold for engine coolant temperature based on the sunload, the threshold triggering sending the engine-on instruction.

Another exemplary embodiment of the present invention relates to a thermal management system for a hybrid electric vehicle, including: an internal combustion engine: an engine control module configured to control the engine: an engine coolant temperature sensor in communication with the control module; an ambient temperature sensor in communication with the control module; and a sunload sensor in communication with the control module. The control module is configured to derive a condition for sending a climate engine request according to sunload. Deriving the condition includes setting a calibrated engine coolant temperature threshold.

Another exemplary embodiment of the present invention relates to a control circuit for a vehicle thermal management system, including: a control module configured to control an internal combustion engine; and a processor in communication with the control module, configured to: set a calibrated threshold for engine coolant temperature according to the sunload reading. The control module is configured to send a climate engine request when the coolant temperature is less than the calibrated threshold.

Yet another embodiment of the present invention relates to a control circuit for a vehicle thermal management system, including: a processor configured to control an internal combustion engine and configured to: (i) determine an engine coolant temperature; (ii) determine an ambient temperature; (iii) determine a sunload; and (iv) derive a condition for sending a climate engine request according to the sunload; and a coolant temperature calibration logic configured to set a calibrated threshold for engine coolant temperature according on the sunload, wherein the threshold triggers sending an engine-on instruction.

One advantage of the present teachings is that they provide better fuel economy in hybrid electric vehicles. The disclosed methods and apparatuses include a more comprehensive assessment of environmental factors that can influence vehicle temperature and in doing so make more efficient demands of the vehicle powertrain. The present teachings have application in purely electric vehicle powertrains as well.

Another benefit of the present teachings is that they provide a simpler solution to adjusting system targets for environmental conditions. An offset due to sunload is a straightforward calibration method.

Another advantage of the present teachings is that various aspects of the vehicle powertrain control can be adjusted to account for the thermal changes resulting from varying solar conditions. For example, engine speed instructions can be adjusted to account for sunload readings.

Another advantage of controlling an HEV thermal management system via an adjusted ambient temperature is that the adjusted ambient temperature also influences other climate-related features and programs that incorporate ambient temperature readings. For example, the vehicle's air conditioning operation logic can adjust for sunload.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

The invention will be explained in greater detail below by way of example with reference to the figures, in which the same references numbers are used in the figures for identical or essentially identical elements. The above features and advantages and other features and advantages of the present invention are readily apparent from the following detailed description of the best modes for carrying out the invention when taken in connection with the accompanying drawings. In the figures:

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION

The following description and adjoining figures pertain at least to exemplary methods for controlling a hybrid electric vehicle and thermal management systems for effectuating the same. The disclosed methods and systems are configured to control a vehicle powertrain according to a myriad of factors including solar energy. Sunload readings are taken from a sunload sensor in communication with a vehicle climate controller having random access memory to store the calibrated thresholds therein. On sunnier days, system thresholds are adjusted to rely on solar energy in substitution or conjunction with other system heaters (e.g., an internal combustion engine).

In hybrid electric vehicles, the internal combustion engine has an on-off cycle that is contingent upon various vehicle performance demands, including heating and cooling needs. Where the engine is used to warm the vehicle cabin the engine can be instructed to turn on solely for the purpose of adding heat to the vehicle cabin. The exemplary methods and systems disclosed herein bring greater fuel efficiency to powertrain management by requiring the engine and other heating sources to be turned on with lesser frequency. While the methods and systems discussed herein are primarily shown with respect to hybrid electric vehicles, other types of powertrains are compatible with the present teachings. Such vehicles include, for example, plug-in HEVs, battery electric vehicles or fuel cell HEVs. The logic discussed herein can be applied to control an internal combustion engine in an HEV or other heating sources such as, e.g. an auxiliary heater pump or positive temperature co-efficient heater (i.e., a PTC heater).

Figure 1:
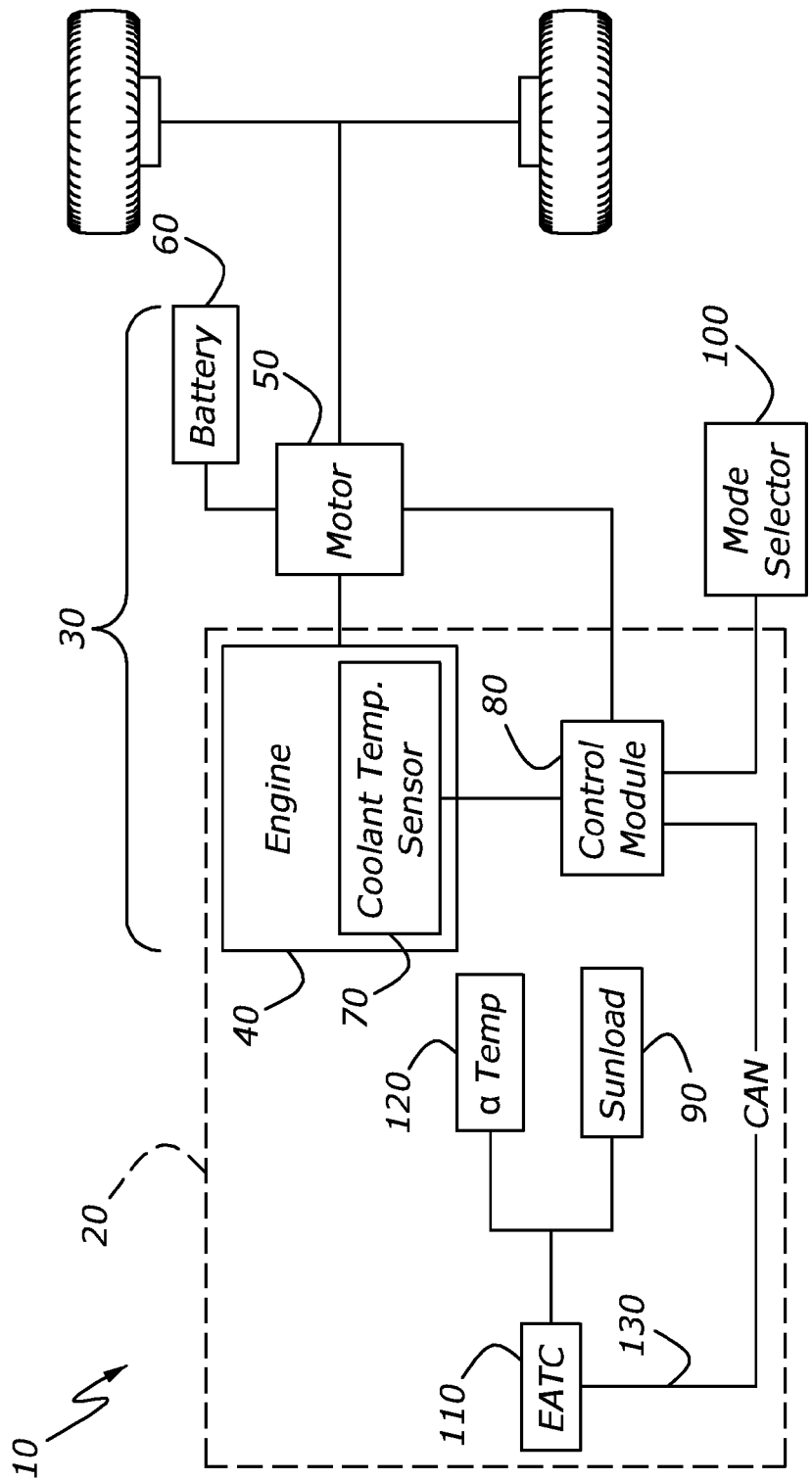
FIG. 1 illustrates a schematic depiction of a hybrid electric vehicle with an exemplary thermal management system.

Referring now to FIG. 1, there is shown therein a schematic depiction of an exemplary hybrid electric vehicle 10 with thermal management system 20. The vehicle 10 includes a powertrain 30 with two primary powers sources. The vehicle 10 is propelled by an internal combustion engine 40 and vehicle motor 50, which is connected to a battery pack 60. The motor 50 and engine 40 can operate independently or in concert. Motor 50 can be included in a vehicle transmission (not shown). Engine 40 is linked to the transmission through a crankshaft (not shown). In this example, the engine 40 is the primary source of heat to the vehicle cabin. Engine coolant is cycled through the vehicle's heating, ventilation and air conditioning system. An engine coolant temperature sensor 70 is included in the vehicle 10. While temperature sensor 70 is shown in the engine 40, the sensor can be located anywhere with respect to the vehicle 10. The sensor 70 measures the temperature of engine coolant exiting the engine 40.

The engine 40 is controlled by a control module 80. Control module 80 is configured to control the engine 40 according to data received from a sunload sensor 90. The control module 80 is also linked to the motor 50. Control module 80 can be, for example, an engine control module, transmission control module, powertrain control module, climate controller or other controller. Control module 80 is in communication with the coolant temperature sensor 70. Readings from the temperature sensor 70 are inputted into the control module 80. The sensor 70 can be hard-wired or wirelessly connected to the control module 80.

The vehicle 10, as shown in FIG. 1, further includes an economy mode selector 100. Said mode selector 100 is a processor configured to receive instructions as to the vehicle's mode of operation and communicate the same to control module 80. In economy mode, the vehicle's operating logic is geared towards greater preservation of energy and/or fuel. Economy mode can consist of any number of predefined settings for running the vehicle. Exemplary settings include operating in electric mode only or reducing standard engine operation settings. Mode selector 100 is linked to a user interface (not shown) that enables the vehicle driver to elect the vehicle's mode of operation. Control module 80 also includes preset conditions for operating in economy mode or non-economy mode. Control module 80 is configured to govern engine performance according to preferred system settings. Control module 80 is linked to mode selector 100 to communicate automated elections made with respect to the vehicle's mode of operation.

Control module 80 is in communication (or linked) to an electronic automated climate control module (or EATC) 110. The EATC 110 is linked to the vehicle HVAC and controls the vehicle cabin temperature. The EATC 110 is included in the vehicle's thermal management system 20. In this embodiment, the EATC 110 takes temperature readings of the vehicle cabin through an in-car temperature sensor (not shown). The climate control module 110 can be any kind of climate control module including, for example, a dual automated climate control module (or "DATC").

An ambient temperature sensor 120, as shown in FIG. 1, is included in the thermal management system 20. The ambient temperature sensor 120 is configured to measure the temperature outside of the vehicle. Also included in the thermal management system 20 of FIG. 1 is a sunload sensor 90. The sunload sensor 90 is configured to measure the solar energy the vehicle 10 is exposed to. Control module 80 is linked to the sunload sensor 90 and ambient temperature sensor 120; control module 80 is configured to accept data related to both sunload and ambient temperature readings therefrom.

The EATC 110 is linked to control module 80 through a local area network or computer area network ("CAN") 130. The network 130 enables the control module 80 to communicate with the EATC 110 and the EATC to communicate with the control module. In this example, the EATC 110 can take measurements of the ambient temperature and accordingly sends commands to the control module 80 of when to power up the engine. In another exemplary embodiment, the control module 80 and EATC 110 are located in a common module and/or processor. The controllers 80 and 110 can be separate or consolidated.

Thermal management system 20 is shown in FIG. 1. The system 20 is configured to control the temperature in the vehicle cabin. In this embodiment, an internal combustion engine 40 is included in the thermal management system and acts as a heater for the system 20. The system includes a blend door (not shown) which is actuated under certain predetermined conditions. The blend door is controlled by the EATC and is configured to mix cooler or warmer air into the vehicle cabin as needed. The engine control module 80 is included in the system 20 and configured to control the engine 40. The engine coolant temperature sensor 70 is in communication with the control module 80 to at least receive data related to coolant temperature readings. The control module 80 can also receive data from the ambient temperature sensor 120 as the sensor is in communication with the control module. Sunload sensor 90 is in communication with the control module 80 as well. Control module 80 includes a processor (as discussed hereinbelow with respect to FIG. 8) that is configured to control the engine 40 according to data received from the sunload sensor 90. Specifically, control module 80 is configured to set calibrated thresholds for engine coolant temperature and modifications for ambient temperature that are adjusted in consideration of sunload readings.

Figure 2:
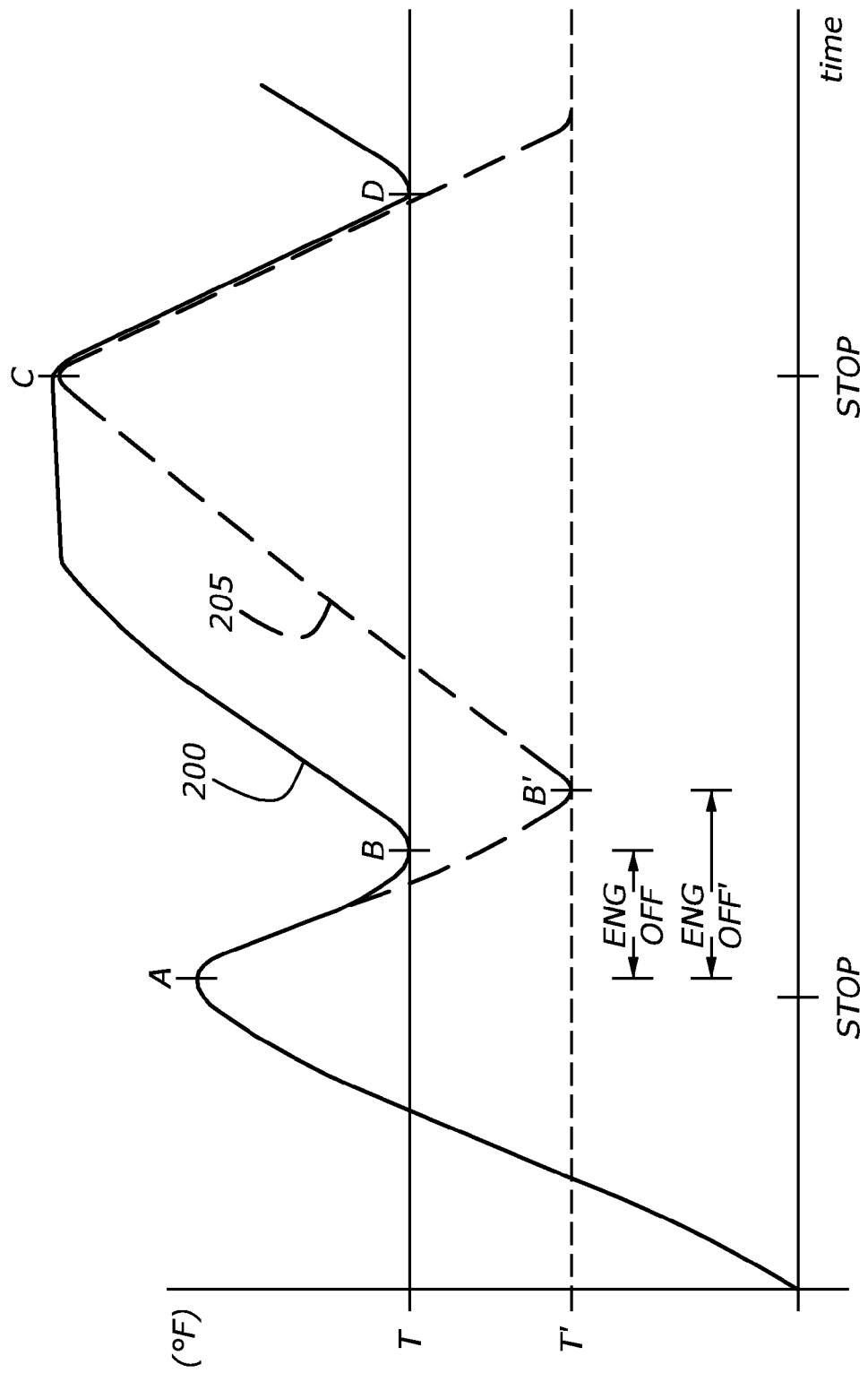
FIG. 2 is a graph showing comparative curves of climate engine requests conditioned upon standard versus calibrated engine coolant temperature thresholds.

Referring now to FIG. 2, there is shown therein two comparative curves 200, 205 of climate engine requests conditioned upon a standard engine coolant temperature threshold (as shown in curve 200) versus a modified engine coolant temperature threshold (as shown in curve 205). The graphs illustrate how there are fluctuations in engine coolant temperature in an exemplary hybrid electric vehicle over time. Throughout a typical drive cycle for the vehicle the engine is shut off and on repetitiously. This cycling causes fluctuation in the engine coolant temperature and the heating capacity of the vehicle's climate control system. Line T represents a standard threshold for engine coolant temperature. The standard threshold temperature is the temperature at which the climate control module sends a climate engine request, for example, instructing the engine to turn on to support the vehicle's heating needs. The minimum or threshold engine coolant temperature is a function of ambient temperature. The climate engine request, such as a pull-up command, is sent until the engine coolant temperature is met (with a hysteresis or within a predetermined range of tolerance). Once the engine coolant temperature drops to or below the value assigned to Line T the engine is instructed to re-start (as shown for example at point B).

At start, as shown in FIG. 2, the engine coolant temperature is at a relatively low temperature. With respect to curve 200, at points A and C the engine is stopped to conserve energy and the vehicle is running solely off of electric energy. After the engine is turned off, the engine coolant temperature significantly reduces. A climate engine request is sent to the engine control unit when the threshold temperature, T, is met. At points B and D, the engine is instructed to turn back on and the engine coolant temperature increases. This threshold can be lower than the standard value when sunload is large enough to significantly warm the vehicle cabin.

In FIG. 2, Line T' represents a modified threshold. T' is set to 10° F. less than the standard threshold and the sunload is at an intensity of 185 counts. With the lower calibrated threshold—set via calibration logic considering solar energy—the engine can stay off for longer periods of time thereby conserving fuel. At start, as shown in FIG. 2, the engine coolant temperature is at a relatively low temperature. With respect to curve 205, at points A and C the engine is turned off to conserve energy and the vehicle is running solely off of electric energy. After the engine is turned off, the engine coolant temperature significantly reduces. A climate engine request is sent to the engine control unit when the threshold temperature, T', is met. At point B' the engine is instructed to turn back on and the engine coolant temperature increases. With the lower threshold, T', the climate engine request is delayed and the engine can stay off for longer periods of time as shown. Compare, the timing of the execution of the climate engine request at point B, using the standard threshold (T), to the timing of the execution of the climate engine request at point B', using the calibrated threshold (T'). B' occurs later than B, thus resulting in fuel conservation.

In one embodiment, anytime the system wishes to avoid sending a climate engine request an extreme value is programmed into the system for the calibrated engine coolant temperature threshold. In one embodiment, the calibrated engine coolant temperature threshold is equaled to 150° F. less than the standard threshold. As such, the engine coolant temperature never reaches the calibrated threshold and a climate engine request is not sent. In this arrangement, vehicle cabin temperature may be compromised to increase fuel economy. Or other sources of heat can be relied on to warm the vehicle cabin.

Figure 3:
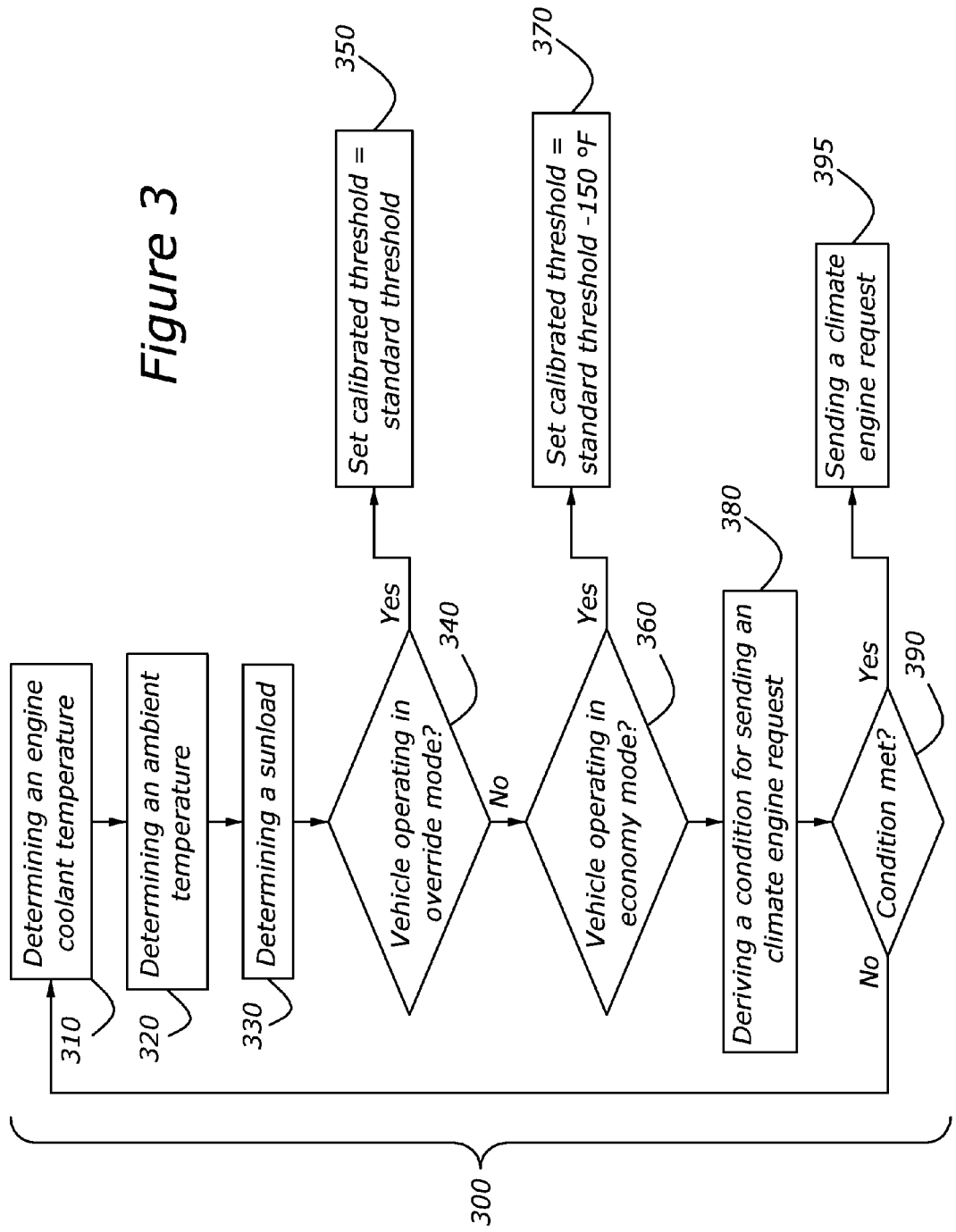
FIG. 3 illustrates an exemplary method of controlling a hybrid electric vehicle.

Now with reference to FIG. 3, there is shown therein a method 300 of controlling a hybrid electric vehicle and/or vehicle powertrain in a manner to account for the thermal energy added by the sun. The method 300 can be implemented by a thermal management system having a computer or processor with software to effectuate the listed steps. The method 300 begins with determining an engine coolant temperature at step 310. The engine coolant temperature can be determined using a temperature sensor (such as 70 shown in FIG. 1). Sensor 70 is configured to continuously take measurements of the engine coolant temperature after exiting the engine. The sensor 70 sends temperature readings to the control module 80 that stores and/or processes the data according to a programmed algorithm (e.g. 300 as shown in FIG. 3). At step 320 the system determines an ambient (or surrounding environment) temperature. The ambient temperature can be determined using a temperature sensor (such as 120 shown in FIG. 1). Sensor 120 is configured to continuously take measurements of the ambient temperature outside of the vehicle. The sensor 120 sends ambient temperature readings to the control module 110. Control module 110 filters the temperature readings before sending them to control module 80.

A sunload sensor, e.g., 90, is also included in the thermal management system 20, as discussed with respect to FIG. 1. At step 330, as shown in FIG. 3, the module determines a sunload from the sunload sensor. Sensor 90 is configured to continuously take measurements of the sunload and send related, data to the control module 110. Control module 110 filters sunload readings before sending the readings to control module 80. At step 340, as shown in FIG. 3, the system determines whether the vehicle is operating in a system override mode. In override mode, the system forgoes calculations for deriving a condition for sending climate engine requests. The calibrated thresholds are set to equal the standard or default thresholds, at step 350, and the system operates without consideration of sunload. Override mode may be preferable when there is a problem detected in the system's hardware. The system can determine whether the vehicle is operating in override mode through a mode selector e.g., 100 in FIG. 1 (external to the control module) or through data collected from the control module (e.g., operating instructions communicated to the powertrain). If the system is not operating in override mode, the algorithm continues to step 360.

At step 360, as shown in FIG. 3, the system checks if the vehicle is operating in a mode where the vehicle's operating logic is geared towards greater preservation of energy and/or fuel economy. The system can determine whether the vehicle is operating in economy mode through a mode selector. If the vehicle is operating in economy mode, the program sets a calibrated threshold to an extreme value at step 370. An exemplary extreme value is 150° F. less than a standard engine coolant temperature threshold. Since the threshold cannot be achieved the system does not send a climate engine request to the ECU and the engine is not instructed to turn on in the interest of climate control.

If the vehicle is not operating in economy mode the system proceeds to step 380. In step 380, the system derives a condition for sending a climate engine request. The condition can be the engine coolant temperature dropping below a calibrated threshold value. The calibrated engine coolant temperature threshold can be derived or set using various indirect and direct techniques related to sunload. In one embodiment, the ambient temperature governs the engine coolant temperature threshold. Ambient temperature is modified according to sunload. The system implements calibration and/or modification logic (e.g., as discussed with respect to FIGS. 4 through 7) to calculate calibrations and modifiers for the thermal management system. Calibrated thresholds and modifications enable the vehicle to conserve fuel and rely on sunload to add heat to the vehicle cabin.

Where the condition is met, at step 390 the system sends a climate engine request at step 395, as shown in FIG. 3. The climate engine request is a command to the engine that facilitates the vehicle's climate needs. An exemplary climate engine request can be to turn the engine on so as to warm engine coolant any time the engine coolant drops below a threshold temperature. The engine can be controlled to turn on under delayed circumstances or until the modified condition is met, thereby reducing the heat provided to the engine coolant. If the condition is unmet, the system returns to step 310 and determines another engine coolant temperature.

Figure 4:
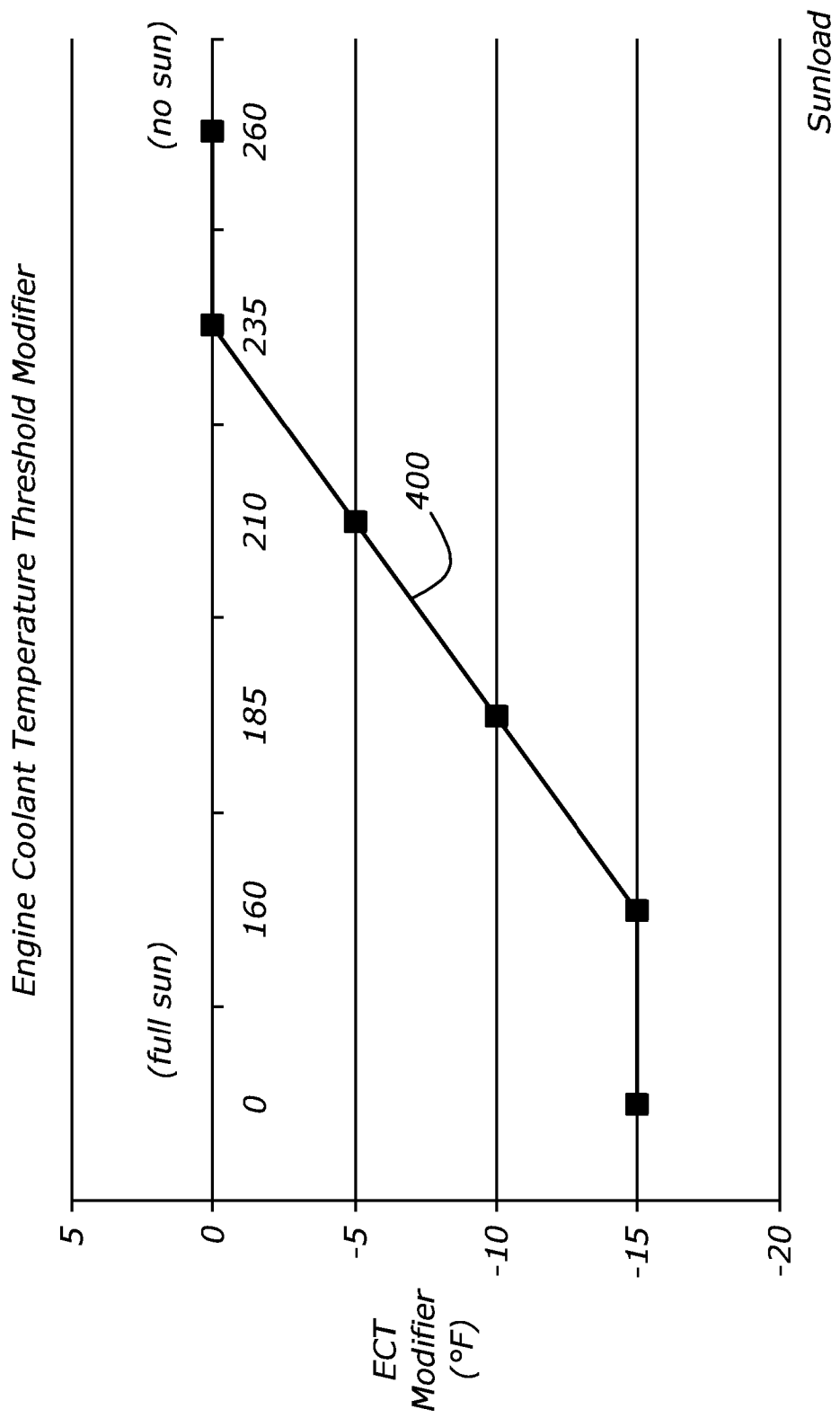
FIG. 4 illustrates an exemplary graph of engine coolant temperature threshold calibration logic.

Referring now to FIG. 4, the system includes a control module having engine coolant temperature calibration logic for deriving a condition for sending a climate engine request. In this embodiment, the condition is the engine coolant temperature dropping below a calibrated engine coolant temperature threshold. The calibration logic 400, as shown in FIG. 4, calculates an engine coolant temperature (or "ECT") modifier at a given sunload. A thermal management system is configured to set a calibrated threshold for engine coolant temperature according to a sunload reading. For example, the sunload sensor can output a signal in volts and the control module can read in values from 0 to 260 counts. In this configuration, the lower the count the higher the solar energy is. In sunny conditions a typical sunload reading is 160 counts. On a cloudier or dark day a typical sunload reading is approximately 245 counts. The calibration setting strategy uses this sunload reading to reduce the engine coolant temperature threshold by a predetermined amount—the ECT modifier, as shown in FIG. 4. When there is no sun, there would be zero reduction. Under a full sunload, the reduction would be on the order of 15° F.

FIG. 4 shows an exemplary graph 400 of an algorithm for setting engine coolant temperature calibrations. The system compares the sunload reading (or "SLR") to a typical value under sunny conditions. If the sunload reading is less than or equal to 160 counts the calibration is constant at −15° F.; accordingly a calibrated ECT threshold is calculated to be 15° F. less than a standard engine coolant temperature threshold. With the lower calibrated threshold the engine can stay off for longer periods of time thereby conserving fuel. If the sunload reading is greater than 160 counts but less than or equal to 235 counts, the calibration is proportional to the sunload. In this range, the modifier is equal to one fifth of the sunload minus 47° F. For example, for a sunload of 185, the modifier is −10° F. and the calibrated engine coolant temperature is set to be 10° F. less than the standard engine coolant temperature. Where the sunload is greater than 235 counts, no modification occurs and the calibrated engine coolant temperature threshold is equal to the standard threshold.

The illustrated calibration logic 400 in FIG. 4 is a calibration function. The engine coolant temperature minimum threshold is adjusted by subtracting a predetermined calibration from the existing or standard minimum threshold. This allows for earlier engine pull-downs and longer engine off times, resulting in a real world fuel economy improvement. Coolant temperature ranges are predetermined and a set value is subtracted from the calibrated engine coolant temperature accordingly. In another embodiment, calibration logic utilizes a calibration chart where preset calibrations are applied according to sunloads within a given range.

Figure 5:
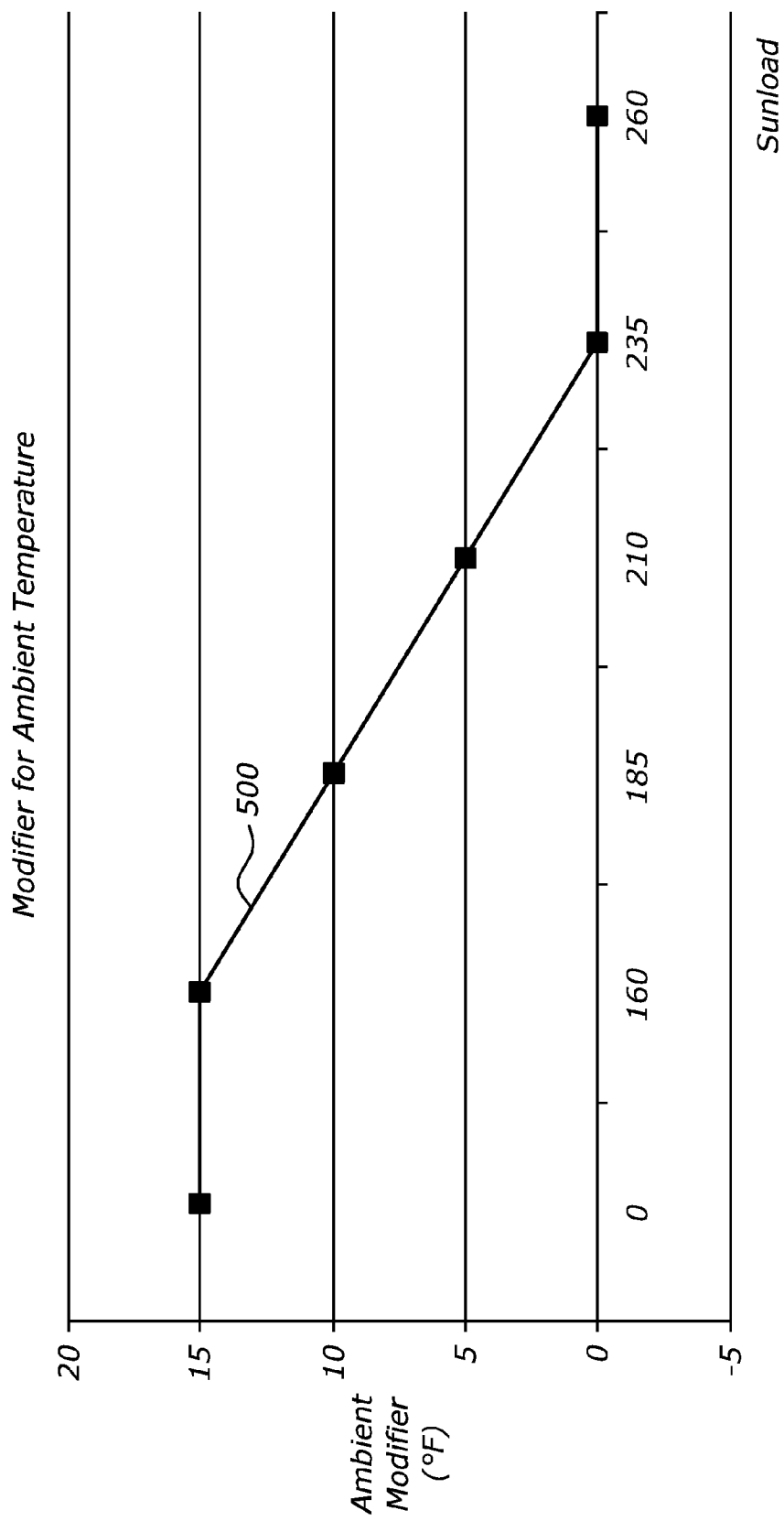
FIG. 5 illustrates an exemplary graph of ambient temperature modification logic.

Referring now to FIG. 5, there is shown therein exemplary modification logic 500 for modifying ambient temperature readings. Meeting a predetermined modified ambient temperature can be another derived condition for sending a climate engine request. Ambient temperature can be modified independently from the calibrated engine coolant temperature threshold or the modified ambient temperature can be used to indirectly calibrate the engine coolant temperature threshold. The modified ambient temperature can be used to adjust the condition for sending a climate engine request in at least two ways. First, as discussed with respect to FIG. 6, the modified ambient temperature can indirectly calibrate an engine coolant temperature threshold. With the lower calibrated ECT threshold the engine can stay off for longer periods of time thereby conserving fuel. Second, as discussed with respect to FIG. 7, the modified ambient temperature can adjust an engine speed instruction. The climate engine request is an engine speed instruction. In this arrangement, the engine can operate at lower speeds using the modified ambient temperature to conserve fuel.

Referring again to the modification logic 500 shown in FIG. 5, the logic 500 compares a sunload reading to a typical value under sunny conditions. If the sunload reading is less than or equal to 160 counts the ambient temperature modifier is equal to 15° F.; the modified ambient temperature is then calculated to be 15° F. more than the standard ambient temperature. If the sunload reading is greater than 160 counts but less than or equal to 235 counts the ambient temperature modifier is calculated to be equal to 47° F. minus one fifth of the sunload. For example, if the sunload is 185, the modified ambient temperature is 10° F. more than the standard ambient temperature. If the sunload reading is greater than 235 counts no modification occurs and the modified ambient temperature is equal to the measured ambient temperature.

This modification allows for earlier engine pull-downs and longer engine off times, resulting in a real-world fuel economy improvement. This modification can also allow for abbreviated engine operations. For example, engine adders can be significantly reduced where the ambient temperature is modified in consideration of sunload.

Figure 6:
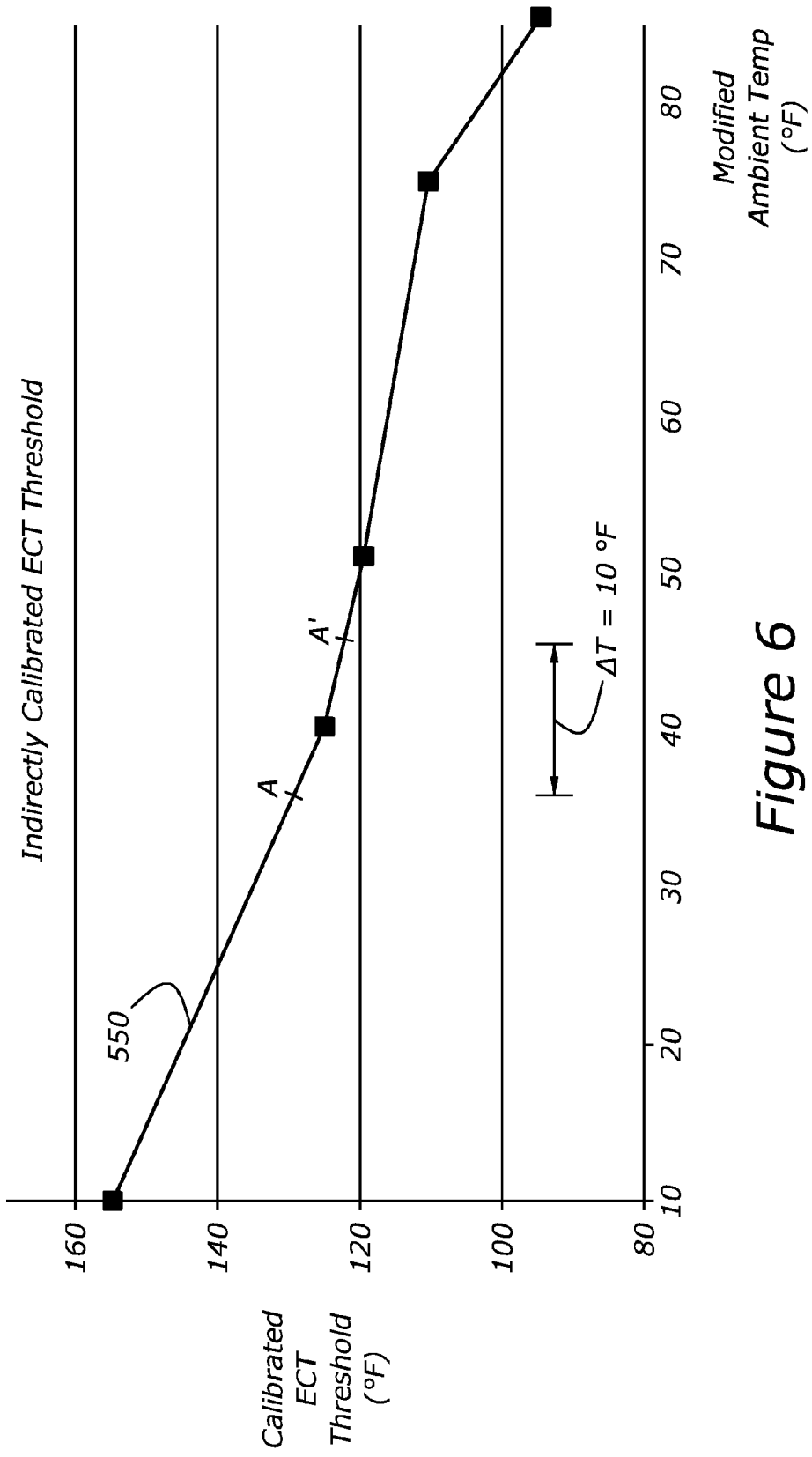
FIG. 6 illustrates an exemplary graph of indirect engine coolant temperature calibration logic.

In FIG. 6, there is shown therein an indirect engine coolant temperature calibration logic 550. An engine coolant (temperature) threshold is indirectly calibrated according to sunload. The threshold depends upon the modified ambient temperature. The ambient temperature is modified according to sunload. An exemplary modification logic for ambient temperature is discussed with respect to FIG. 5. In the logic 550 shown in FIG. 6, the calibrated ECT threshold is proportional to the modified ambient temperature at different rates. For example, between 10° F. and 40° F., the calibrated ECT threshold is equal to 176° F. minus 1.33 multiplied by the modified ambient temperature. The modifier rate is −1.33. Between 40° F. and 75° F., modifier rate is −0.37. The calibrated ECT threshold is equal to 138.5 minus 0.37 multiplied by the modified ambient temperature. At point A, as shown in FIG. 6, the ambient temperature is equal to 35° F. The ECT threshold is set to approximately 130° F. After modified, as shown as point A', the ambient temperature is ten degrees higher −45° F. As a result, the ECT threshold drops to approximately 122° F. In this example, a ten degree modification in ambient temperature results in an approximately eight degree reduction in the ECT threshold.

For modified ambient temperatures greater than 75° F., the modifier rate is more aggressive (as shown in FIG. 6). Since the slope is negative and the modified ambient temperature is greater than the measured value the calibrated engine coolant temperature threshold is effectively reduced by this calibration.

Figure 7:
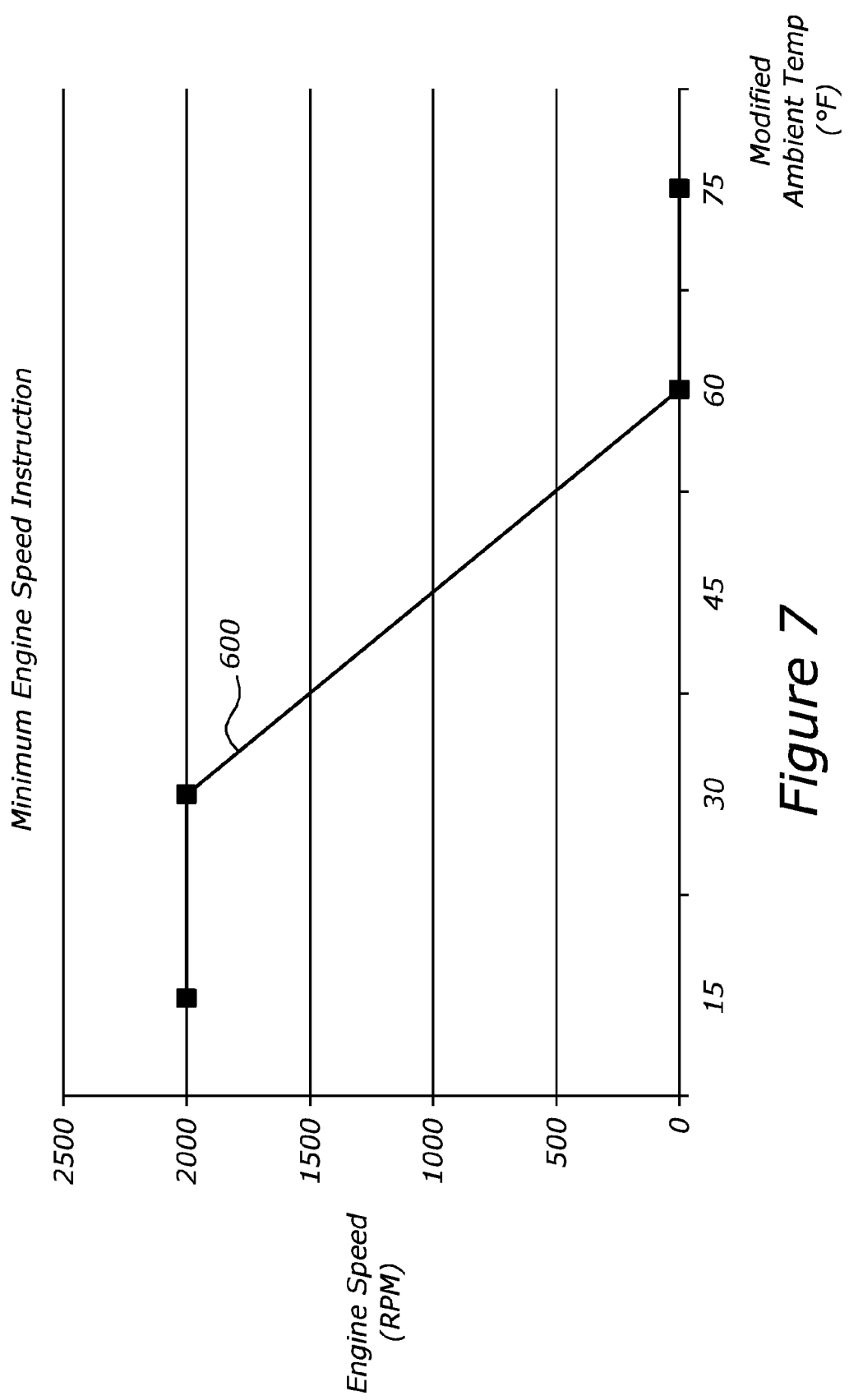
FIG. 7 illustrates an exemplary graph of engine speed logic.

Referring now to FIG. 7, there is shown therein an exemplary graph of instructions for engine speed according to modified ambient temperatures. Engine speed logic 600 adjusts an engine climate control, in this case an engine speed instruction, according to sunload. In this example, the engine speed is a function of the modified ambient temperature. When ambient temperatures are low and engine coolant temperature is relatively cold, the strategy commands engine speeds that are higher than what is optimal for fuel economy. This helps the engine coolant temperature rise more quickly but can be detrimental to fuel economy as the engine is operating at a less efficient point. The system adjusts the engine speed based on the sunload reading. This adjustment uses an artificially increased or modified ambient temperature (for example as discussed with respect to FIG. 5).

Engine speed logic 600 governs engine speed. With a higher modified ambient temperature the engine can run at a reduced speed thereby conserving fuel. As shown, the engine speed is 2000 RPMs where the modified ambient temperature is less than 30° F. Where the modified ambient temperature is greater than 30° F. but less than 60° F., the engine speed instruction behaves proportionally to the modified ambient temperature. For example, wherein the modified ambient temperature is equal to 45° F., the minimum climate engine speed instruction is only 1000 RPMs. In this example, the minimum engine speed is equal to 4000 RPMs minus a rate multiplied times the modified ambient temperature threshold. The rate is −66.67 in this example. The rate can vary according to vehicle specifications. If the modified ambient temperature is 45° F., for example, the minimum engine speed instruction will be equal to approximately 1000 RPMs. Where the modified ambient temperature is greater than 60° F. no engine speed instruction is sent to the ECU. In another embodiment, a look-up table can be programmed into the controller for the thermal management system. For example, in another embodiment the control module includes an engine adder look-up table according to calibrated engine coolant temperature.

Figure 8:
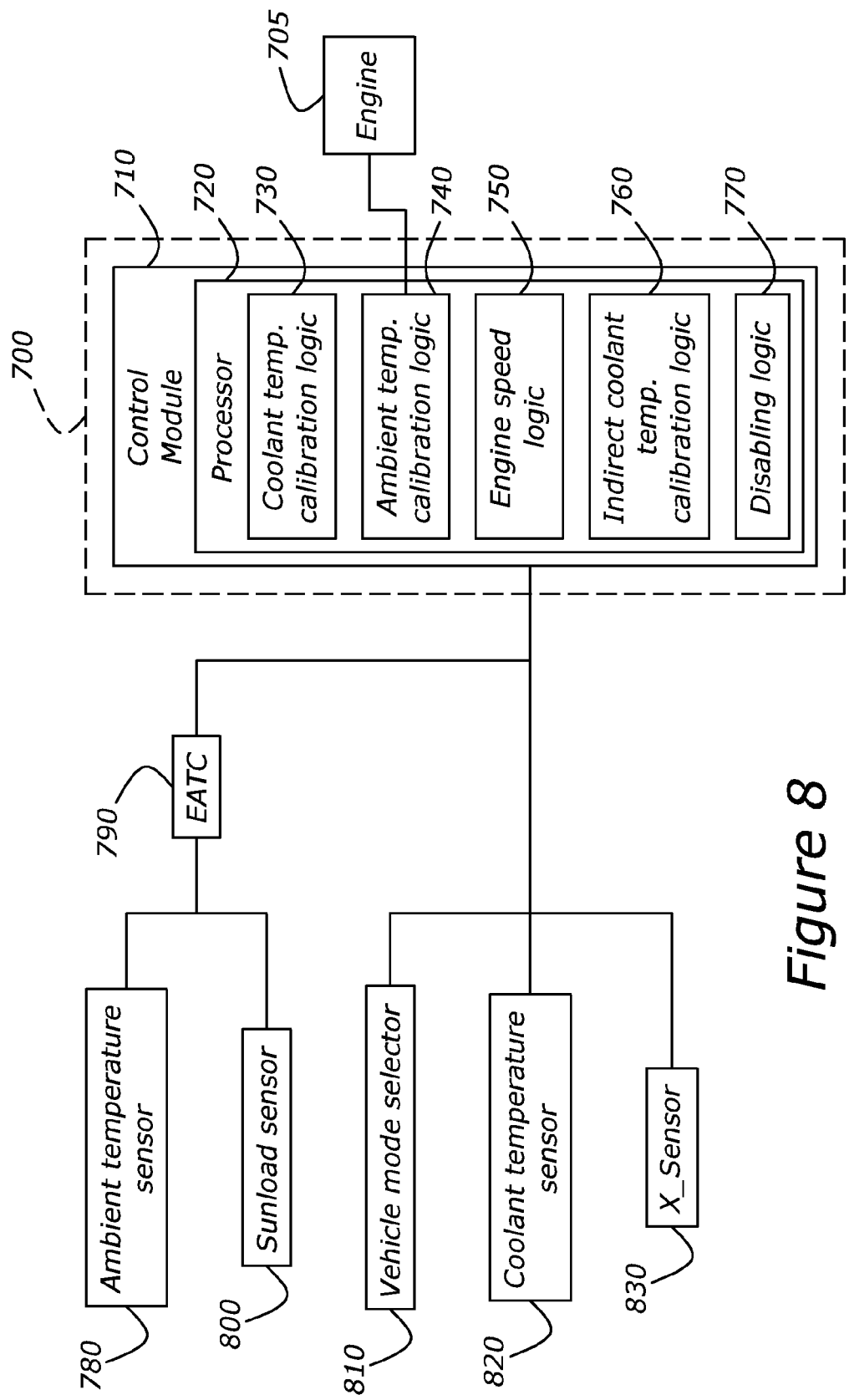
FIG. 8 illustrates an exemplary control circuit for a vehicle thermal management system.

A control circuit 700 for a thermal management system is illustrated in FIG. 8. The control circuit 700 is configured to control the system and/or an internal combustion engine 705 to reduce fuel usage therein when sunnier conditions are a significant factor. Control circuit 700 can, for example, run the programs discussed with respect to FIGS. 3-7. The control circuit 700, as shown in FIG. 8, includes a control module 710 configured to control an internal combustion engine. Control module 710 is in communication with the engine. Control module 710 can be, for example, a powertrain control module or vehicle system controller. Control module 710 includes a processor 720 in communication or linked with the control module. Processor 720 includes coolant temperature calibration logic 730. Coolant temperature calibration logic 730 is configured to set a calibrated threshold for engine coolant temperature based on the sunload reading. An example of calibration logic is shown and discussed with respect to the algorithm 400 of FIG. 4.

Referring again to FIG. 8, the processor 720 is configured to modify an ambient temperature according to sunload readings as well. Processor 720 includes ambient temperature modification logic 740. The ambient temperature modification logic 740 is configured to set a modified ambient temperature based on sunload readings and reduce engine function accordingly. An example of ambient temperature modification logic is shown and discussed with respect to the algorithm 500 of FIG. 5.

Engine speed logic 750 is also included in the processor 720 as shown in FIG. 8. Engine speed logic 750 is configured to derive engine speed instructions according to modified ambient temperature. Exemplary, engine speed logic 600 is shown in FIG. 7.

An indirect coolant temperature calibration logic 760, as shown in FIG. 8 is also included in the control circuit 700. The calibration logic 760 derives a condition for sending a climate engine request according to another variable that is adjusted according to sunload. FIG. 6 illustrates an exemplary calibration logic 550 which adjusts an ECT threshold according to a modified ambient temperature. The threshold triggers sending the climate engine request.

The processor also includes disabling logic 770 (as shown in FIG. 8). Disabling logic 770 prevents the transmission of the calibrations and/or modifiers to the pertinent portions of the processor. Disabling logic 770 is active under certain conditions. If the vehicle is operating in an override mode disabling logic 770 may be active. In one arrangement, disabling logic 770 prevents the transmission of the modified ambient temperatures to the engine coolant temperature calibration logic 730. Accordingly, the system operates under standard conditions as opposed to the calibrated and modified settings.

In another embodiment, disabling logic 770 functions to disable the calibration/modification logics 730, 740, 750 and 760 under predetermined conditions. For example, when the vehicle is not operating in an economy mode, the disabling logic 770 can be configured to disable any one of the coolant temperature, ambient temperature and engine speed calibration/modification logics. Thus, in "non-econ" mode, the system will continue to maintain a higher ECT to account for quick changes in sunload (i.e., clouds blocking sunlight) since the HVAC blend door responds more quickly than engine coolant temperature changes. Another option is to completely remove the minimum engine coolant temperature threshold for climate control and engine speed in "economy mode," regardless of sunload. Minimally, the engine speed instructions can be removed (or significantly reduced) when the climate control system is not on or not in a heating mode. Disabling logic 770 can also be configured to disable any one of the calibration or modification logics when the system is operating in economy mode. The calibration or modification strategies can be in place at all times with potentially little to no degradation in customer comfort.

Control module 710 is configured to control an internal combustion engine in accordance with the method shown in FIG. 3. Control module 710, as shown in FIG. 8, is in communication or linked to various sensors, selectors, and powertrain components. For example, control module 710 is linked to an ambient temperature sensor 780 configured to take measurements of the temperature outside of the vehicle. The ambient temperature sensor 780 is indirectly linked or in communication with the control module 710 through an electronic automated climate controller (or EATC) 790. The thermal management system also includes a sunload sensor 800 that is linked to the EATC 790. The readings from the sunload sensor 800 are sent over a network to the vehicle control module 710. Other radiation measuring devices can be substituted for the sunload sensor including, but not limited to, solar panels, ultra-violet sensors and radiation sensors.

A vehicle mode selector 810, as shown in FIG. 8, is in communication with the control module 710. Mode selector 810 is configured to accept and send signals related to whether the vehicle is operating in an economy mode. Mode selector 810 can be linked to a switch, for example, that the user can activate when economy mode is selected. Control module 710 is also linked to an engine coolant temperature sensor 820. The sensor 820 is configured to take measurements of the engine coolant temperature. This data is then communicated to the control module 710. Other sensors, as represented by "X_Sensor" 830 can be incorporated into the thermal management system to influence system calibration/modification logic(s) 730, 740, 750 and 760. For example, a vehicle cabin temperature sensor is linked to the control module through the EATC module in another embodiment to provide data on the temperature inside the vehicle cabin. Processor 720 considers this temperature in governing the thermal management system as well.

While the thermal management systems illustrated herein relate to use of an internal combustion engine to add heat to the HVAC, other electric vehicle components can be manipulated in consideration of sunload readings. Moreover, instead of engine coolant temperature control the engine can also be an indirect source of heat by generating the electric power needed to run auxiliary heating systems (e.g., positive temperature co-efficient heaters for full HEV and plug-in HEVs (or PHEVs), fuel cell HEVs or an auxiliary heater pump when the engine is off). For a PHEV or battery electric vehicle (BEV), a battery can be the primary source of energy to run these systems.

Though the links with the control module are described in terms of hardwired connections, any one of the components can be wirelessly linked to the control module. Bluetooth technology, configured to enable short-range communication between electronic devices, is utilized to enable the sensors and other components to communicate with the control module wirelessly. Other wireless standards or technologies can be used with the thermal management system such as infrared systems, RF systems, IEEE standard 802.11 and other communications platforms.

It will be apparent to those skilled in the art that various modifications and variations can be made to the methodologies of the present disclosure without departing from the scope of its teachings. Other embodiments of the invention will be apparent to those skilled in the art from consideration of the specification and practice of the teachings disclosed herein. It is intended that the specification and examples be considered as exemplary only.

While the best modes for carrying out the invention have been described in detail, those familiar with the art to which this invention relates will recognize various alternative designs and embodiments for practicing the invention within the scope of the appended claims.

I claim:
1. A method of controlling a hybrid electric vehicle, the method comprising:
   determining an engine coolant temperature;
   determining an ambient temperature;
   determining a sunload; and
   deriving a condition for sending a climate engine request according to the sunload;
   wherein the climate engine request includes an engine-on or an engine speed instruction;
   wherein deriving a condition includes setting a calibrated threshold for engine coolant temperature based on the sunload, the threshold triggering sending the engine-on instruction.

2. The method of claim 1, wherein setting the calibrated threshold for engine coolant temperature includes:
   (i) modifying the ambient temperature according to the sunload; and
   (ii) setting the calibrated engine coolant temperature threshold according to the modified ambient temperature.

3. The method of claim 1, further comprising:
   determining whether the vehicle is operating in an economy mode; and
   setting the calibrated threshold to be equal to 150 degrees less than a standard engine coolant temperature threshold when the vehicle is operating in the economy mode.

4. The method of claim 1, wherein deriving a condition includes setting a modified ambient temperature according to the sunload and calculating an engine speed instruction according to the modified ambient temperature.

5. A thermal management system for a hybrid electric vehicle, comprising:
   an internal combustion engine;
   an engine control module configured to control the engine;
   an engine coolant temperature sensor in communication with the control module;
   an ambient temperature sensor in communication with the control module; and
   a sunload sensor in communication with the control module;
   wherein the control module is configured to derive a condition for sending a climate engine request according to sunload;
   wherein deriving the condition includes setting a calibrated engine coolant temperature threshold.

6. The system of claim 5, wherein the control module is configured to send an engine-on instruction when the calibrated engine coolant temperature threshold is met.

7. The system of claim 5, wherein deriving the condition includes setting a modified ambient temperature; and setting the calibrated engine coolant temperature threshold according to the modified ambient temperature.

8. The system of claim 5, wherein deriving the condition includes setting a modified ambient temperature and calculating an engine speed instruction according to the modified ambient temperature.

9. The system of claim 5, wherein the control module is configured to detect if the vehicle is operating in an economy mode and set a calibrated engine coolant temperature threshold to be equal to 150 degrees less than a standard engine coolant temperature threshold when the vehicle is operating in the economy mode.

10. A control circuit for a vehicle thermal management system, comprising:
 a control module configured to control an internal combustion engine; and
 a processor in communication with the control module, configured to:
  (i) determine an engine coolant temperature;
  (ii) determine an ambient temperature;
  (iii) determine a sunload; and
  (iv) set a calibrated threshold for engine coolant temperature according to the sunload reading;
 wherein the control module is configured to send a climate engine request when the coolant temperature is less than the calibrated threshold.

11. The control circuit of claim 10, wherein the climate engine request comprises an instruction to turn the engine on.

12. The control circuit of claim 10, wherein the control circuit is configured to modify the ambient temperature according to sunload and set a calibrated engine coolant temperature threshold according to the modified ambient temperature.

13. The control circuit of claim 12, wherein the control circuit is configured to calculate an engine speed instruction according to the modified ambient temperature.

14. A control circuit for a vehicle thermal management system, comprising:
 a processor configured to control an internal combustion engine and configured to:
  (i) determine an engine coolant temperature;
  (ii) determine an ambient temperature;
  (iii) determine a sunload; and
  (iv) derive a condition for sending a climate engine request according to the sunload; and
 a coolant temperature calibration logic configured to set a calibrated threshold for engine coolant temperature according on the sunload, wherein the threshold triggers sending an engine-on instruction.

15. The control circuit of claim 14, further comprising:
 an ambient temperature modification logic configured to modify the ambient temperature according to sunload; and
 an indirect coolant temperature calibration logic configured to set the calibrated engine coolant temperature threshold according to the modified ambient temperature.

16. The control circuit of claim 14, further comprising:
 an ambient temperature modification logic configured to modify the ambient temperature according to sunload; and
 an engine speed logic configured to calculate an engine speed instruction according to the modified ambient temperature.

17. The control circuit of claim 14, wherein the control circuit includes disabling logic configured to prevent transmission of the climate engine request.

* * * * *